United States Patent [19]

Lee et al.

[11] Patent Number: 5,830,345
[45] Date of Patent: Nov. 3, 1998

[54] PROCESS OF PRODUCING A DEBENZENATED AND ISOMERIZED GASOLINE BLENDING STOCK BY USING A DUAL FUNCTIONAL CATALYST

[75] Inventors: Chung-Hur Lee; Chi-Hsing Tsai; Jingly Fung, all of Taipei, Taiwan

[73] Assignee: Chinese Petroleum Corporation, Taipei, Taiwan

[21] Appl. No.: 613,779

[22] Filed: Feb. 28, 1996

[51] Int. Cl.$^6$ ..................................................... C10G 7/00

[52] U.S. Cl. ............................ 208/92; 208/79; 208/134; 208/143; 585/253

[58] Field of Search ................................ 208/57, 92, 79, 208/134, 143; 585/253

[56] References Cited

U.S. PATENT DOCUMENTS

| | | | |
|---|---|---|---|
| 3,625,879 | 12/1971 | Horne | 208/57 |
| 4,441,988 | 4/1984 | Irvine | 208/64 |
| 4,828,675 | 5/1989 | Sayer | 208/57 |
| 5,132,486 | 7/1992 | Wylie | 585/820 |
| 5,210,348 | 5/1993 | Hsieh et al. | 585/253 |

*Primary Examiner*—Helane Myers
*Attorney, Agent, or Firm*—Bacon and Thomas

[57] ABSTRACT

A process for producing a debenzeneated gasoline blending stock from a benzene-containing refinery stream by using a dual function catalyst. The benzene-containing refinery stream contains at least 2 wt % of benzene is hydrogenated to cyclohexane and then isomerized to methylcyclopentane accompanied with $C_5$–$C_7$ normal paraffins isomerized to isoparaffins, preferably in a single reactor or catalytic distillation reactor using dual function catalyst.

11 Claims, 2 Drawing Sheets

5,830,345

PROCESS OF PRODUCING A DEBENZENATED AND ISOMERIZED GASOLINE BLENDING STOCK BY USING A DUAL FUNCTIONAL CATALYST

FIELD OF THE INVENTION

The present invention relates to a process for producing a debenzenated and isomerized gasoline blending stock from a benzene-containing refinery stream more particularly by using a dual function catalyst, preferably in a single reactor/ or catalytic distillation reactor.

BACKGROUND OF THE INVENTION

Among the components of gasoline, benzene is a known carcinogen and the major contributor to toxic air pollutants. The Clean Air Act Amendments (CAAA) of 1990 specify that benzene content in U.S. reformulated gasoline be limited to 1.0 vol %. It is therefore highly desirable to remove benzene from gasoline blending stock such as reformate.

There are several prior arts for benzene removal processes which, in fact, have difficulty for producing high quality gasoline.

For example, U.S. Pat. No. 5,189,233 discloses a two steps hydrogenation process for production of cyclohexane by liquid phase hydrogenation of benzene which comprises contacting benzene and hydrogen in the presence of a mixed catalyst bed comprising a first catalyst which is a less active hydrogenation catalyst selected from elements of group VIII of the Periodic Table and a second, more active catalyst, comprising a Group VIII metal supported on an oxide such as alumina, silica, or titanic The advantage of this designation is to mitigate the rapid increase of the reacting temperature without using any diluent. But the lower octane cyclohexane produced in this process is not desirable for a gasoline blending stock.

The U.S. Pat. No. 5,210,348 discloses a process which alkylates the benzene-rich fraction of refinery stream with the $C_2$–$C_4$ olefins in an alkylating zone of a catalytic distillation column. The remaining light fraction is hydrogenated to convert substantially all of the remaining non-alkylated benzene to cyclohexane and is isomerized to convert $C_5$–$C_7$ normal paraffins to isoparaffins in a single reactor but in a different reacting zone thereof.

The disadvantages of this process are the aromatics content in the gasoline blending stock can not be reduced effectively to the desired level and it also consumes the valuable $C_2$–$C_4$ olefins.

In this regard, it is highly desirable to hydrogenate benzene in the benzene-containing refinery stream into cyclohexane and simultaneously isomerized cyclohexane into methylcyclopentane, and $C_5$–$C_7$ normal paraffins into isoparaffins by using a dual functional catalyst, preferably in a single reactor/or catalytic distillation reactor.

SUMMARY

The present invention discloses a process for producing debenzenated and isomerized gasoline blending stock from a benzene-containing refinery stream by using a dual functional catalyst, preferably in a single reactor, to hydrogenate the benzene into cyclohexane and simultaneously to isomerize cyclohexane into methylcyclopentane and $C_5$–$C_7$ normal paraffins into isoparaffins to minimize the octane number loss.

The present process is applicable to the benzene-containing refinery streams, including reformate, FCC (Fluid Catalytic Cracking) gasoline, stright-run naphtha and coker naphtha, among others. Reformate is a preferable feedstock. Table 1 shows the properties of reformate which is suitable to the present invention. Table 2 shows the components of a typical reformate and table 3 shows the components of a typical light reformate. The feedstock may also include a mixture of light fraction of FCC gasoline/or coker naphtha (boiling below 95° C.) and light reformate. Preferable feedstocks may contained benzene in the range of 2 wt % to 15 wt % and boiling between 15° C. and 105° C.

DETAILED DESCRIPTION OF THE INVENTION

A. Refering to FIG. 1

(1) A benzene-containing refinery stream, such as refromate, feed into a first distillation column 12 via line 10 to distillate into a benzene-rich lighter fraction and a benzene-lean heavier fraction.

The benzene-lean heavier fraction will be then sent directly to a gasoline blending stock container (not shown) via line 16.

A $C_5$_200° F. light reformate fraction exits the distillation column via line 14 and mixed with a recycle gas of make-up hydrogen and light gas from a gas-liquid separator 30 via line 36 through a compressor 34 then to hydrogenation and isomerization reactor 20.

The molar ratio of hydrogen to hydrocarbon in the mixed feed can range from about 0.01/1 up to 5/1. The feeding rate of the mixed feed can vary from about 0.1 to 10 $hr^{-1}$ of LHSV (Liquid Hourly Space Velocity).

(2) The dual function reactor 20 contains a high activity dual functional catalyst to hydrogenate the benzene-rich hydrocarbon into debenzenated products including cyclohexane and normal $C_5$–$C_7$ paraffins of low octane number and simultaneously to isomerize the debenzenated products into methylcyclopentane and $C_5$–$C_7$ isoparaffins of higher octane number.

The reacting conditions of the reactor 20 include a temperature which falls within a range from 100° C. to 300° C., a pressure which falls within a rang from 50 psig to 1500 psig, preferably between 100~500 psig.

(3) The effluent from the reactor 20 passes through a heat exchanger 22 via line 24 and into a gas-liquid separator 30 via line 25.

The gas from the gas-liquid separator 30 is mixed with make-up hydrogen from line 32 and recycled via line 35 through the compressor 34 and line 36 to the reactor 20 after being mixed with the benzene-rich fraction from the distillation column 12 via line 14 as described before.

(4) The liquid product from the bottom of the gas-liquid separator 30 is feed via line 38 to distillation column 40.

The distillation column 40 separates the remained $C_1$–$C_4$ hydrocarbons from the liquid products. The $C_1$–$C_4$ gas will be exited through line 44 for isobutane recovering or used as fuel.

The liquid product in the distillation column 40 is then sent to the gasoline blending stock reservoir (not shown) via line 42.

Figure 2:
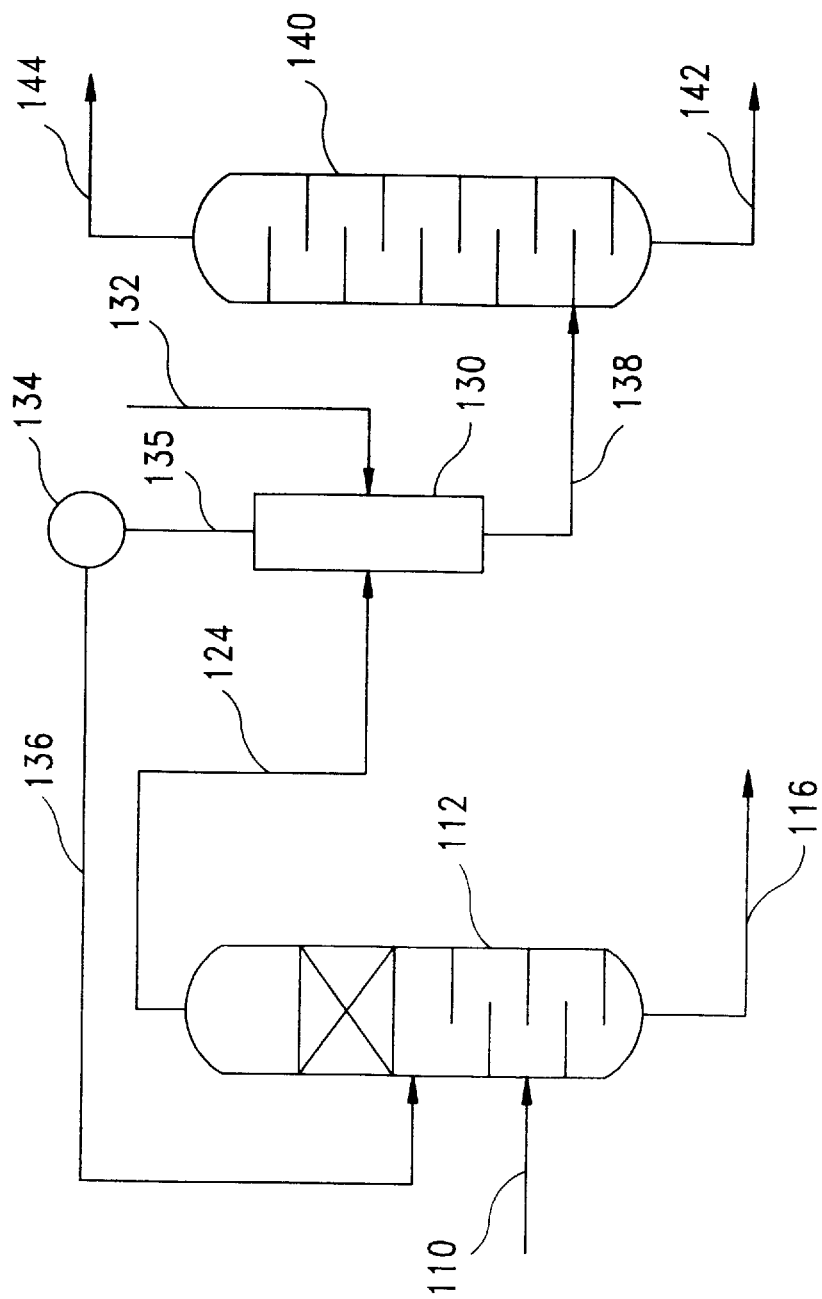
FIG. 2 shows a schematic drawing of another embodiment according to the process of the present invention.

B. Refering to FIG. 2.

Figure 1:
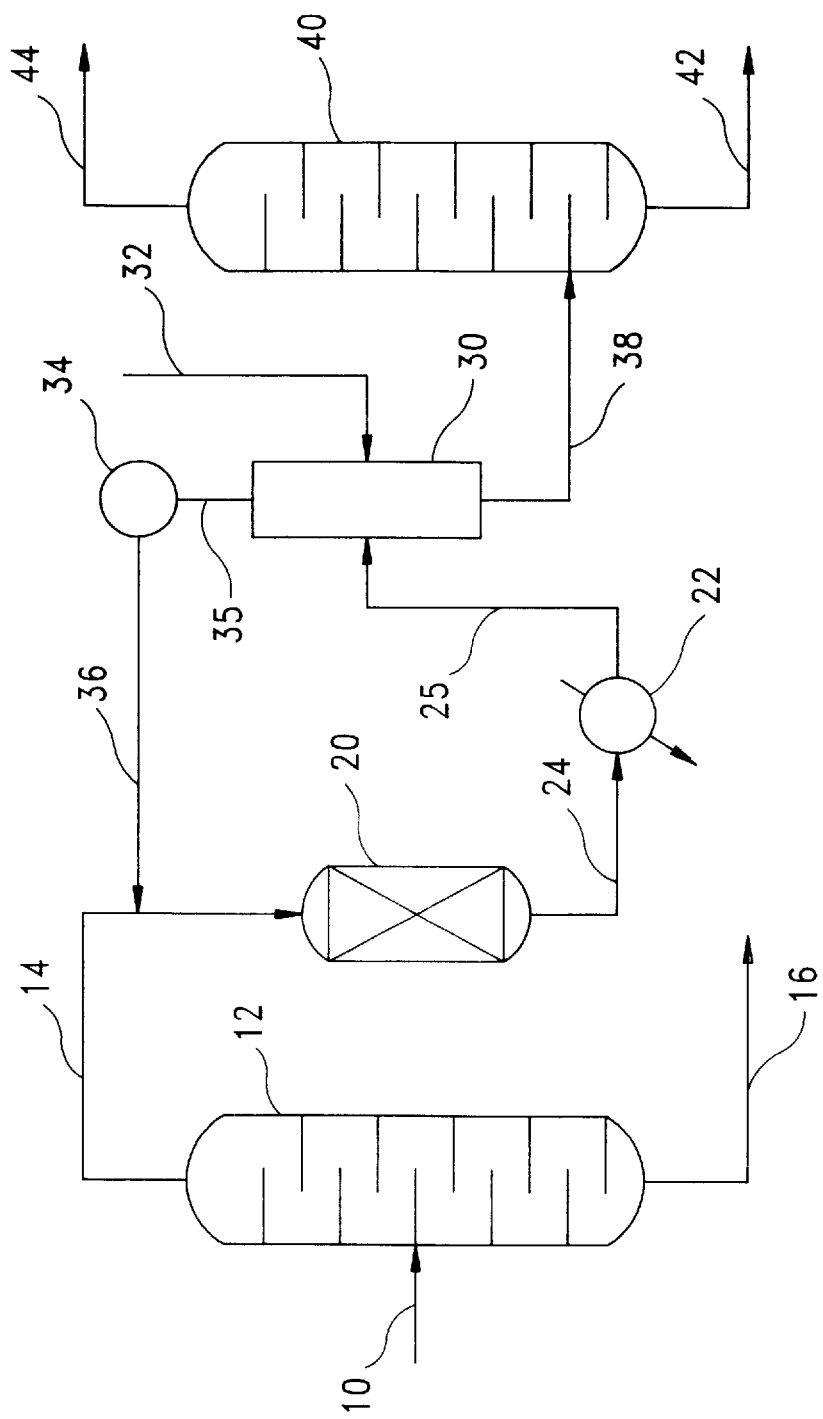
FIG. 1 shows a schematic drawing of a preferable embodiment according to the process of the present invention.

(1) A Catalytic distillation reactor 112 is a combination of a distillation column 12 and a dual function reactor 20 shown in FIG. 1, having a distillating zone in a lower portion and a catalytic reacting zone in an upper portion with dual functional catalyst therein, and namely so called a catalytic distillation reactor therefor.

A benzene-containing refinery stream, such as reformate, feed into the distillating zone of the reactor 112 via line 110 to distil the benzene-containing refinery stream into a benzene-lean heavier fraction and a benzene-rich lighter fraction.

The benzene-lean heavier fraction is directly sent to a gasoline blending stock reservoir (not shown) via line 116 while the benzene-rich lighter fraction directly passes through the catalytic reacting zone of the column 112.

A recycle gas of make-up hydrogen and $C_1$–$C_4$ hydrocarbons which feedback from a gas-liquid separator 130 via line 136 through a compressor 134 is supplied to the catalytic reacting zone of the column 112 and mixed with the benzene-rich fraction in a molar ratio of hydrogen to hydrocarbon ranged from about 0.01/1 to 5/1.

The benzene-rich fraction is then hydrogenated into debenzenated products including cyclohexane and $C_5$–$C_7$ paraffins of low octane and simultaneously to isomerize the debenzenated products into methylecyclopentane and $C_5$–$C_7$ isoparaffins of higher octane.

The reacting conditions of the reactor 112 include a temperature which falls within a range from 100° C. to 300° C., a pressure which falls within a range from 50 psig to 1500 psig, preferably between 50 psig and 500 psig, and a WHSV (Weight Hourly Space Velocity) which falls within a range from 0.1 to about 10 $hr^{-1}$.

(2) The effluent from the reactor 112 is sent to the gas-liquid separator 130 via line 124, then the separated gas in the separator 130 is mixed with make-up hydrogen from line 132 and sent to the compressor 134 via line 135 then fed back to the catalytic reacting zone of the reactor 112.

(3) While the liquid product in the separator 130 is sent to a distillation column 140 to separate the remained $C_1$–$C_4$ light gas from the liquid product.

The $C_1$–$C_4$ hydrocarbons from the column 140 will be collected through line 144 for isobutane recovering or used as fuel.

The liquid product in the column 140 is then sent to the gasoline blending stock reservoir (not shown) via line 142.

C. The dual functional catalyst used in the present invention to provide the high activity hydrogenation and isomeration function may comprise a group VIII metal, preferably a platinum and a large pore zeolite, preferably a Beta; a Mordenite or a Y zeolite.

(a) The dual functional catalyst composed of platinum and either a Beta zeolite or a Mordenite zeolite is preformed by following steps:

(1) mixing and kneading the Beta or Mordenite zeolite powder with a binder such as psuedoboehmite powder in a 65:35 ratio by weight, water, and nitric acid;

(2) extruding the mixture of step (1) through a shapable dough;

(3) calcining the extrudate at 538° C. for 3 hrs;

(4) ion-exchanged the extrudate with a solution of 4.8 mM platinic ammonia nitrate and 1.0N ammoniam nitrate under room temperature for 24 hrs.;

(5) drying the above material at a temperature of 90° C.; then (6) calcined at 350° C. for 3 hrs.. Eventually, the catalyst contains about 0.9–1.0 wt % platinum.

(b) While the dual functional catalyst composed of platinum and a Y zeolite is preformed by following steps:

(1) mixing and kneading the Y zeolite powder with a binder of psuedoboehmite powder in a 65:35 ratio by weight, water and nitric acid;

(2) extruding the mixture of step (1) through a shapable dough;

(3) calcining the extrudate at 538° C. for 3 hrs.;

(4) ion-exchanged the extrudate with a solution of 2.4 mM platinic ammonia nitrate under room temperature for 24 hrs.;

(5) drying the above material at 90° C.; then (6) calcined at 350° C. for 3 hrs.. Eventually, the catalyst contains about 0.3 wt % of platinum.

The results of the performance test of the above three different types of zeolite containing catalyst are shown in table 5, and the components of light reformate used for testing is shown in table 4. The test is carried out as follows:

1. Preparation:

load 10 c.c. of 1/16 inches extrudate catalyst into a stainless steel reactor which is 7/8 inches in diameter, and then introduce hydrogene into the reactor in a temperature of 400° C. for 4 hrs. to activate the dual function catalyst.

2. Testing:

feed the benzene-rich light reformate which has been distilled from the full range reformate and hydrogen in a molar ratio 2.3/1 into the reactor by a feeding rate of 20 c.c./hr..

3. Analysis:

the reaction products are analyzed by a gas chromatography equipped with a 50 meter Petrocol™ (Supelco Inc.) Capillary column. Part of results are listed in table 5.

TABLE 1

| The Properties of Reformate | |
|---|---|
| Gravity | 0.72 ~ 0.88 |
| Boiling point °C. | 15 ~ 210 |
| Benzene | 2 ~ 50 |
| Toluene | 2 ~ 50 |
| $C_8$ + Aromatics | 2 ~ 50 |

TABLE 2

| Components of A Typical Reformate, wt % | |
|---|---|
| $C_4$ Hydrocarbons | 3.3 |
| $C_5$ Hydrocarbons | 7.0 |
| $C_6$ (Non-benzene) | 11.8 |
| Benzene | 3.0 |
| $C_7$ (Non-toluene) | 11.7 |
| Toluene | 11.7 |
| $C_8$ Aromatics | 17.0 |
| $C_9$ Aromatics | 15.4 |
| $C_{10}$ Aromatics | 7.6 |

TABLE 3

| Components of A Typical Light Reformate, wt % | |
|---|---|
| $C_4$ Hydrocarbons | 6.2 |
| $C_5$ Hydrocarbons | 16.4 |
| $C_6$ (Non-benzene) | 37.6 |
| Benzene | 10.3 |
| Toluene | 0.8 |

TABLE 4

Content of Light Reformate Used for Testing, wt %

| | |
|---|---|
| $C_1$–$C_3$ | 0.3 |
| $iC_4$ | 2.4 |
| $nC_4$ | 5.4 |
| $iC_5$ | 10.9 |
| $nC_5$ | 8.0 |
| $iC_6$ | 22.2 |
| $nC_6$ | 10.1 |
| Methylcyclopentane | 1.2 |
| Cyclohexane | 0.1 |
| Benzene | 8.3 |
| Toluene | 1.2 |

TABLE 5

Test Results of the
Three Types of Preformed Dual Function Catalysts
Reacting Temperature = 260° C.   LHSV = 2 hr$^{-1}$

| Product Distribution wt % | Catalyst Type 1 Pt/Beta/Al$_2$O$_3$ | Catalyst Type 2 Pt/Mordenite/Al$_2$O$_3$ | Catalyst Type 3 Pt/Y/Al$_2$O$_3$ |
|---|---|---|---|
| $C_1$–$C_3$ | 4.8 | 1.3 | 2.3 |
| $iC_4$ | 8.8 | 3.8 | 5.1 |
| $nC_4$ | 6.3 | 5.7 | 4.4 |
| $iC_5$ | 12.9 | 12.6 | 10.7 |
| $nC_5$ | 7.6 | 8.4 | 7.2 |
| $iC_6$ | 25.4 | 27.2 | 22.6 |
| $nC_6$ | 7.2 | 9.4 | 8.8 |
| Methyl-cyclopentane | 6.4 | 6.8 | 6.1 |
| Cyclohexane | 2.0 | 2.2 | 3.5 |
| Benzene | 0 | 0 | 0 |
| Toluene | 0 | 0 | 0 |

We claim:

1. A process for producing a debenzenated and isomerized gasoline blending stock from a benzene-containing refinery stream by using a dual functional catalyst, comprising:
   (I) a distillation step to separate said benzene-containing refinery stream into a substantially benzene-lean heavier fraction and a benzene-rich lighter fraction in a distillation column,
   (ii) a dual function reacting step to hydrogenate said benzene-rich lighter fraction into a debenzenated product and simultaneously to isomerize cyclohexane and $C_5$–$C_7$ normal paraffins of low octane number debenzenated product into methylcyclopentane and $C_5$–$C_7$ isoparaffins of higher octane number within a single reactor having said dual functional catalyst therein.

2. A process as set forth in claim 1, wherein said dual functional reacting conditions include a temperature which falls within a range from about 100° C. to about 300° C., a pressure which falls within a range from about 50 psig to about 1500 psig, a hydrogen to hydrocarbon molar ratio which falls within a range from about 0.01 to about 5, and a LHSV (liquid hourly space velocity) which falls within a range from about 0.1 to about 10 hr$^{-1}$.

3. A process as set forth in claim 1, wherein said dual functional reacting conditions include a temperature which falls within a range from about 100° C. to about 300° C., a pressure which falls within a range from about 50 psig to about 1500 psig, a hydrogen to hydrocarbon molar ratio which falls within a range from about 0.01 to about 5, and a WHSV which falls within a range from about 0.1 to about 10 hr$^{-1}$.

4. A process as set forth in claims 1 or 12, wherein said dual functional catalyst comprises a Group VIII metal, and an aluminosilicate zeolite.

5. A process as set forth in claim 4, wherein said Group VIII metal of said dual functional catalyst comprises platinum.

6. A process as set forth in claim 4, wherein said zeolite of said dual functional catalyst is Zeolite Beta.

7. A process as set forth in claim 4, wherein said zeolite of said dual functional catalyst is Zeolite Mordenite.

8. A process as set forth in claim 4, wherein said zeolite of said dual functional catalyst is Zeolite Y.

9. A process as set forth in claim 1, wherein at least 25 wt % of cyclohexane resulted from the hydrogenation of benzene is isomerized into methylcyclopentane in step (ii).

10. A process as set forth in claim 1, wherein at least 25 wt % of cyclohexane resulted from the hydrogenation of benzene is isomerized into methylcyclopentane in the said reacting zone within the said catalytic distillation reactor.

11. The process of claim 1 wherein said distillation step and said dual function reacting step take place in a catalytic distillation reactor; said catalytic distillation reactor including:
   1. a distillation zone for separating said benzene-containing refinery stream into a substantially benzene-lean heavier fraction and a benzene-rich lighter fraction; and
   2. a dual function reacting zone having said dual functional catalyst therein for converting said benzene-rich lighter fraction into debenzenated and isomerized products continually and simultaneously in said zone by reaction catalyzed by said dual functional catalyst.

* * * * *